(12) United States Patent
Gonidec et al.

(10) Patent No.: US 9,995,246 B2
(45) Date of Patent: Jun. 12, 2018

(54) THRUST REVERSER FOR NACELLE OF AIRCRAFT TURBOFAN

(71) Applicant: SAFRAN NACELLES, Gonfreville L'Orcher (FR)

(72) Inventors: Patrick Gonidec, Bretx (FR); Olivier Kerbler, Antony (FR); Corentin Hue, Le Marais Vernier (FR); Patrick Boileau, Tournefeuille (FR)

(73) Assignee: SAFRAN NACELLES, Gonfreville L'orcher (FR)

( * ) Notice: Subject to any disclaimer, the term of this patent is extended or adjusted under 35 U.S.C. 154(b) by 271 days.

(21) Appl. No.: 15/371,281

(22) Filed: Dec. 7, 2016

(65) Prior Publication Data
US 2017/0328305 A1    Nov. 16, 2017

Related U.S. Application Data

(63) Continuation of application No. PCT/FR2015/051500, filed on Jun. 5, 2015.

(30) Foreign Application Priority Data

Jun. 16, 2014 (FR) ..................... 14 55494

(51) Int. Cl.
*F02K 1/72* (2006.01)
*F02K 1/12* (2006.01)
*F02K 1/76* (2006.01)

(52) U.S. Cl.
CPC .............. *F02K 1/72* (2013.01); *F02K 1/1261* (2013.01); *F02K 1/763* (2013.01); *Y02T 50/671* (2013.01)

(58) Field of Classification Search
CPC .......... F02K 1/72; F02K 1/1261; F02K 1/763
See application file for complete search history.

(56) References Cited

U.S. PATENT DOCUMENTS 3,981,450 A     9/1976  McCardle, Jr. et al.
4,132,068 A  *  1/1979  Johnston ................. F02K 1/805
                                                  239/265.39

(Continued)

FOREIGN PATENT DOCUMENTS

FR    2929998    10/2009
FR    2934326    1/2010

(Continued)

OTHER PUBLICATIONS

International Search Report for International Application PCT/FR2015/051500, dated Nov. 25, 2015.

*Primary Examiner* — Ted Kim
(74) *Attorney, Agent, or Firm* — Burris Law, PLLC

(57) ABSTRACT

A thrust reverser for a nacelle of an aircraft turbojet engine includes at least one movable thrust reverser cowl, a means for locking the cowl, a variable section outlet nozzle, and at least one actuator including an actuator rod. The thrust reverser is provided with a resilient coupler comprising a body which is rigidly connected to the thrust reverser cowl and a resilient return and abutment device that engages with the actuating rod of the actuator such as to resiliently return the nozzle to a neutral position. The return device is calibrated such that, when the cowl is unlocked, the return device opposes the relative movement of the actuating rod relative to the cowl, such as to enable the movement of the cowl and the nozzle, and when the cover is locked, the actuator drives the actuating rod against the return device to enable the movement of the nozzle.

10 Claims, 2 Drawing Sheets

(56) References Cited

U.S. PATENT DOCUMENTS

| | | | |
|---|---|---|---|
| 8,707,675 B2* | 4/2014 | Abel | F02K 9/978 239/265.19 |
| 2003/0159430 A1* | 8/2003 | Lair | B64C 15/02 60/228 |

FOREIGN PATENT DOCUMENTS

| | | |
|---|---|---|
| FR | 2958910 | 10/2011 |
| FR | 2991670 | 12/2013 |

* cited by examiner

THRUST REVERSER FOR NACELLE OF AIRCRAFT TURBOFAN

CROSS-REFERENCE TO RELATED APPLICATIONS

This application is a continuation of International Application No. PCT/FR2015/051500, filed on Jun. 5, 2015, which claims the benefit of FR14/55494, filed on Jun. 16, 2014. The disclosures of the above applications are incorporated herein by reference.

FIELD

The present disclosure relates to the coupling of a thrust reverser for an aircraft turbojet engine nacelle with an associated variable section nozzle.

BACKGROUND

The statements in this section merely provide background information related to the present disclosure and may not constitute prior art.

An aircraft is moved by several turbojet engines each housed in a nacelle accommodating a set of auxiliary actuation devices associated with the operation thereof and ensuring various functions when the turbojet engine is operating or shut down.

In particular, these auxiliary actuation devices comprise a thrust reverser mechanical system.

A turbojet engine nacelle generally has a substantially tubular structure comprising an air inlet upstream of the turbojet engine, a median section intended to surround a fan of said turbojet engine, a downstream section intended to surround the combustion chamber of the turbojet engine and possibly integrating thrust reversal means, and is generally ended by an ejection nozzle the outlet of which is located downstream of the turbojet engine.

Modern nacelles are intended to accommodate a bypass turbojet engine capable of generating through the blades of the rotating fan, a hot air flow (primary flow) and a cold air flow (secondary flow) which flows outside the turbojet engine through an annular passage, also called flow path formed between a fairing of the turbojet engine and an inner wall of the nacelle. The two air flows are ejected from the turbojet engine through the rear of the nacelle.

The role of a thrust reverser is, during the landing of an aircraft, to improve the braking capacity thereof by redirecting forward at least one portion of the air ejected from the turbojet engine. In this phase, the thrust reverser obstructs at least one portion of the flow path of the cold flow and directs this flow forward of the nacelle, thereby generating a counter-thrust which is added to the braking of the wheels and the air brakes of the aircraft.

Generally, the structure of a thrust reverser comprises a thrust reverser cowl which can be displaced between, on the one hand, a reverse jet position in which it opens in the nacelle, a passage intended for the diverted air flow, and on the other hand, a direct jet position in which it closes this passage.

In the case of a thrust reverser with cascade vanes, the reorientation of the air flow is performed by the cascade vanes, associated with thrust reverser flaps blocking at least partially the air flow path, the cowl having only a simple sliding function aiming to uncover or cover these cascade vanes.

In turn, the thrust reverser flaps, also called blocking flaps are activated and driven by the sliding of the movable cowl until obstructing at least partially the flow path downstream of the cascade vanes, so as to optimize the reorientation of the cold air flow.

In a known manner, the cascade vanes are mounted on a front frame serving as a fixed portion of the thrust reverser device and attached to a casing of the fan of the turbojet engine. This front frame also ensures the support for the actuating cylinders of the movable cowls.

Besides participating in a thrust reversal function, as it belongs to the rear section of the nacelle, a movable thrust reverser cowl includes de facto a downstream portion forming the ejection nozzle.

The section of the ejection nozzle can be adapted depending on the different phases of flights, namely, in particular the takeoff, climb, cruise, descent and landing in order to always maintain an optimal nozzle section depending on the turbojet engine speed. The nozzle will be therefore called variable nozzle.

Such a variable nozzle is associated with an actuation system enabling this section variation.

There are several solutions to realize a variable nozzle.

A first solution is to provide pivoting end flaps mounted on the movable thrust reverser cowl and the pivoting of which results in an increase or a reduction of the outlet section. Such a system is described in particular in the documents FR 2 929 998 and FR 2 934 326.

There are also known panels movably mounted in translation inside the movable thrust reverser cowl, telescopically, the backward movement or retraction of which similarly causes the increase or the reduction of the outlet section.

In the case of a thrust reverser provided with a variable section nozzle, it is known to actuate the deployment of the movable cowl and the variation mechanism of the variable nozzle by the same cylinders, the movable cowl and the variable nozzle being coupled and uncoupled by a coupling device.

This coupling device selectively and rigidly connects the cowl and the variable nozzle, the variable nozzle being free when the cowl is locked on the structure of the thrust reverser in the direct jet position, and the variable nozzle being coupled on the cowl when the cowl is unlocked, so that the nozzle and the cowl are simultaneously driven in displacement.

In general, this type of coupling device is relatively complex and often requires an alignment of different parts in order to enable the coupling of the cowl and the variable nozzle.

The high number of parts of this type of coupling device can be a source of failure and often leads to an average reliability.

In addition, the coupling and uncoupling jerks are not damped and may lead to disadvantageous constraints in terms of wear and reliability of the mechanical parts.

SUMMARY

The present disclosure provides a thrust reverser for an aircraft turbojet engine nacelle comprising at least:
- a thrust reverser cowl movable in translation along a direction substantially parallel to a longitudinal axis of the nacelle, between a direct jet position and a reverse jet position,
- a variable section outlet nozzle which is arranged in the downstream extension of said cowl and which is movable between at least one reduced ejection section position, one increased ejection section position and one intermediate neutral position, and at least one actuator which comprises a body mounted on a fixed structure of the thrust reverser and an actuating rod, said rod being adapted to drive in displacement the variable nozzle and the movable cowl, characterized in that the thrust reverser is equipped with an elastic coupler including:

a body which is secured to the thrust reverser cowl, and an elastic return and abutment device which are supported by the body of the coupler and which cooperate with the actuating rod in order to elastically return the nozzle to the neutral position thereof, said return and abutment means are calibrated so that, when the cowl is unlocked, the return and abutment means oppose the relative displacement of the actuating means relative to the cowl, so as to enable the displacement of the constituted by the cowl and the nozzle, and when the cowl is locked, the actuator drives the actuating rod against the return means, so as to enable the displacement of the nozzle.

The thrust reverser provided by the present disclosure is simpler, lighter, more compact and more reliable than the thrust reversers using relative lockings of the nozzle and the movable thrust reverser cowl.

Indeed, the thrust reverser according to the present disclosure is devoid of control means, it requires no device for synchronizing and aligning the thrust reverser cowl and the nozzle.

According to another feature, the elastic return and abutment device is calibrated so that the neutral position of the nozzle is substantially invariable, whether the cowl is locked on the fixed structure of the thrust reverser or the cowl is unlocked.

In particular, this feature allows limiting the jerks during the passage of the cowl from a locked state to an unlocked state.

The coupler includes:

a cavity which is formed by the body of the coupler, which has a hollow shape extending generally axially along the axis of the actuating rod and which is radially delimited by an radial upstream wall and a radial downstream wall, a piston which is fastened on the actuating rod of the actuator and which is slidingly mounted in the body of the coupler dividing said cavity into a first compartment and a second compartment, and a first spring and a second spring, forming said elastic return means, which are axially interposed between the upstream wall of the body and the piston, and between the downstream wall and the piston respectively.

The coupler has a simple and reliable design which enables limiting the stroke of the actuating rod and therefore protecting the nozzle against extremely large forces transmitted by the actuating rod of the actuator.

In order to limit the jerks during the passage of the cowl from a locked state to an unlocked state, the thrust reverser includes damping device.

In addition, the damping device include a damping fluid which fills the cavity of the body of the coupler, the piston of the coupler having a channel allowing the damping fluid to flow between the first compartment and the second compartment of the cavity during the displacement of the piston, for damping the displacement of the actuating rod.

This damping type provides a simple and space saving solution to effectively damp the movements of the actuating rod.

In one form, the damping device are designed to have a time constant close to the duration required to switch the nozzle from the reduced ejection section position thereof to the increased ejection section position thereof, said time constant being greater than the duration of deployment of the movable cowl of the thrust reverser.

This feature also allows reducing the jerks transmitted to the nozzle during the displacement of the actuating rod.

According to another aspect, the actuating rod includes a first segment which is slidingly mounted in the body of the actuator and a second segment which supports the piston of the coupler, said segments being connected to each other by a mechanical connection allowing a noticeable offset of the axes of the first segment and the second segment of the actuating rod.

The mechanical connection is designed to allow an uncoupling of the first segment and the second segment from the actuating rod.

In one form, the mechanical connection includes a head with an elliptical section which is connected to a free end of the first segment of the rod, and a U-shaped fastener which is connected on a free end of the second segment of the rod and which cooperates with said associated head so as to allow a relative displacement of the head and the fastener and to allow an uncoupling of the first segment and the second segment from the actuating rod.

The present disclosure also concerns an aircraft turbojet engine nacelle equipped with a thrust reverser according to the teachings herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
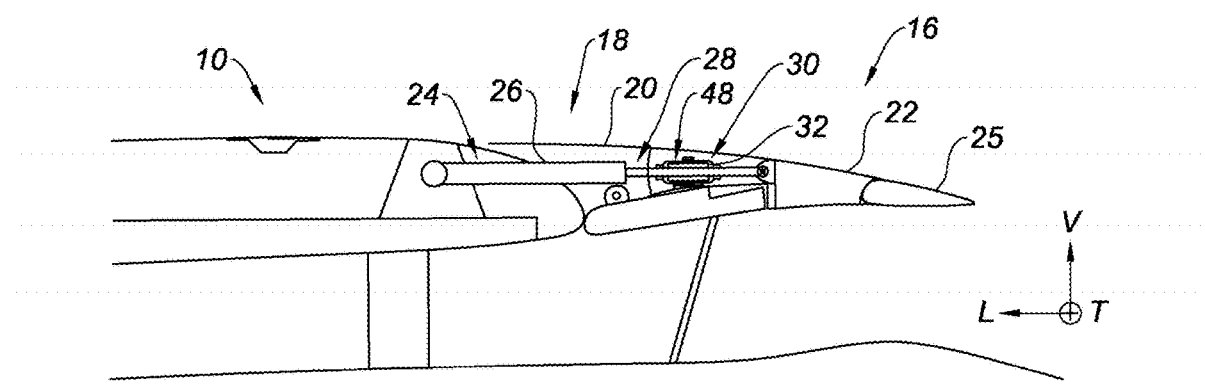
FIG. 2 is a schematic view in a longitudinal section, which illustrates the movable cowl of the thrust reverser in direct jet position and the elastic coupler according to the present disclosure.
Figure 6:
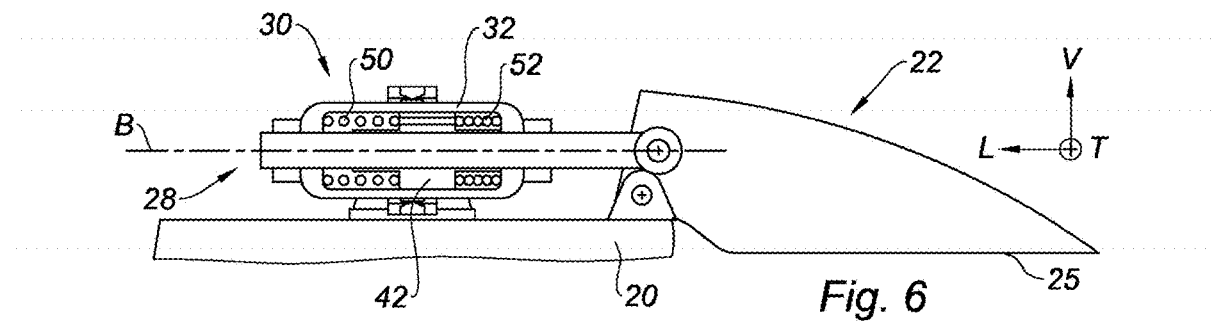
Figure 7:
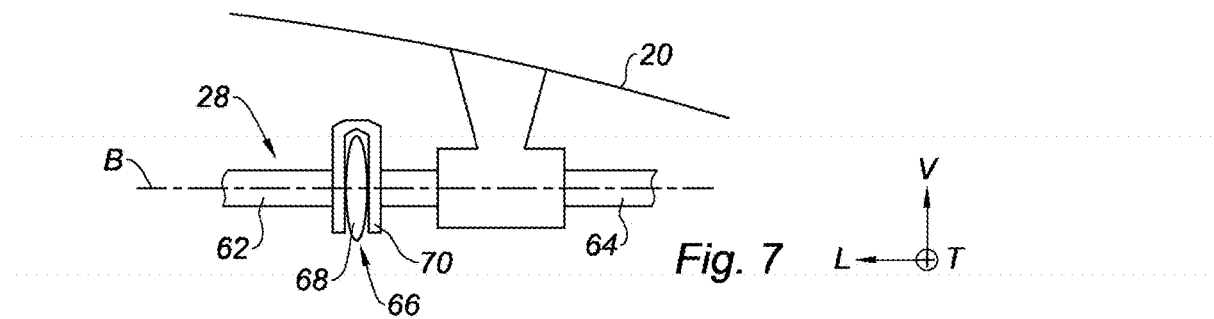

FIG. 6 is a schematic detail view in a longitudinal section, which illustrates the coupler of FIG. 2 in a position corresponding to a position of a reduced ejection section of the nozzle; and FIG. 7 is a schematic detail view in a longitudinal section, which illustrates the mechanical connection allowing a noticeable offset of the axes of the first segment and of the second segment of the actuating rod.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, there will be used, without limitation, the terminology longitudinal, vertical and transversal with reference to the trihedron L, V, T indicated in the figures, the L axis of which is parallel to the axis of the nacelle.

It is to be noted that, in the present patent application, the terms "upstream" and "downstream" must be understood relative to the air flow inside the propulsion unit formed by the nacelle and the turbojet engine, that is to say from the left to the right in FIGS. 1 to 7.

In the figures, the identical or similar references represent identical or similar members or sets of members.

Figure 1:
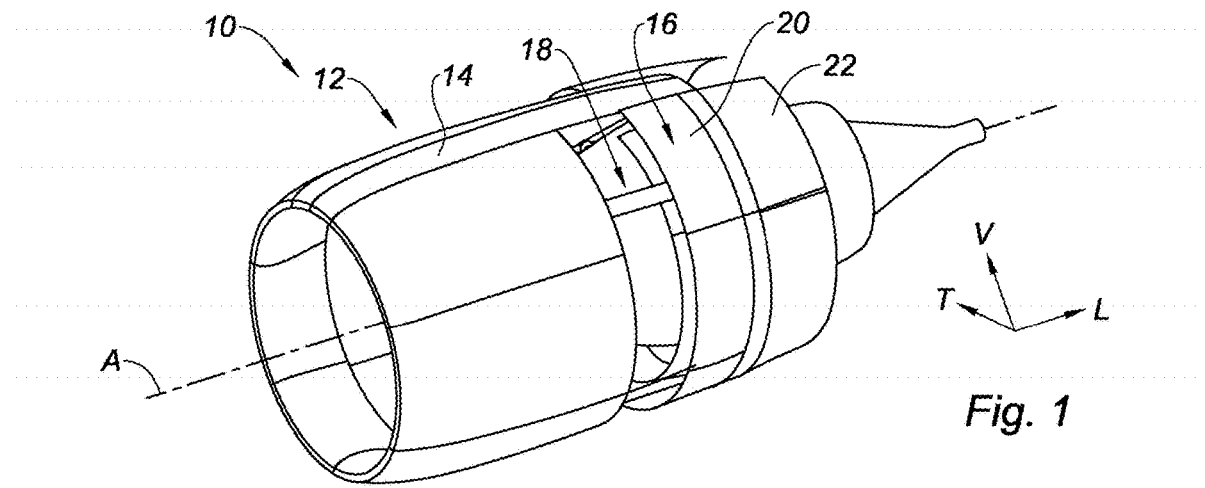
FIG. 1 is a perspective overall view, which illustrates a turbojet engine nacelle equipped with a thrust reverser and a variable nozzle.

There is shown in FIG. 1 a turbojet engine nacelle 10 for an aircraft, which extends axially along a longitudinal axis A.

The nacelle 10 includes a fixed front portion 12 which includes a central beam 14 for fastening on the aircraft, and a rear movable portion 16.

The movable rear portion 16 includes a thrust reverser 18 which comprises a thrust reverser cowl 20 and a variable section ejection nozzle 22 arranged in the downstream extension of the cowl 20.

Figure 3:
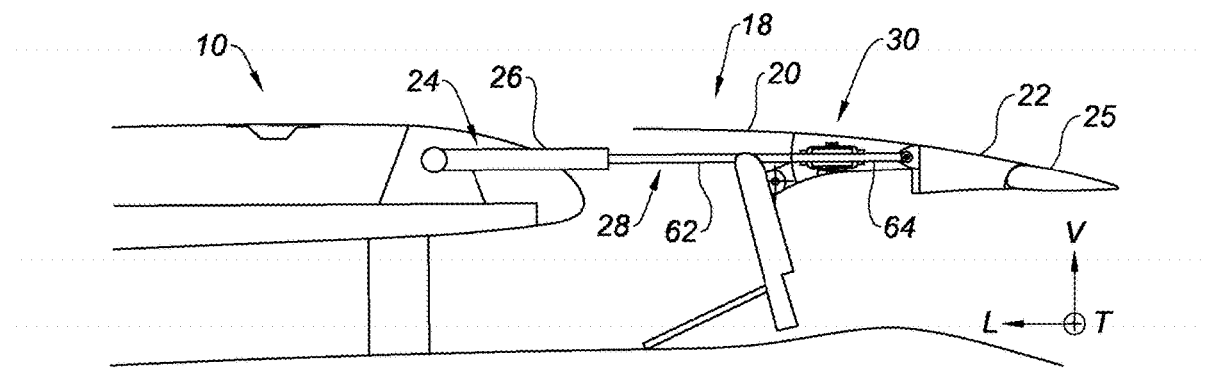
FIG. 3 is a schematic view in a longitudinal section, which illustrates the movable cowl of the thrust reverser in the reverse jet position and the elastic coupler according to the present disclosure.

The thrust reverser cowl 20 is movably mounted in translation along a direction substantially parallel to the longitudinal axis A of the nacelle 10, between a direct jet position shown in FIG. 2, in which the cowl 20 opens in the nacelle 10 a passage intended for the diverted air flow, and a reverse jet position shown in FIG. 3 in which the cowl 20 closes the passage.

The thrust reverser 18 is equipped with means (not shown) for diverting the air flow which for example consist of fixed cascade or movable cascade diverting means.

The cowl 20 is driven in displacement by means of a plurality of cylinders 24 only one of which is described hereinafter and shown in the figures.

In addition, the cowl 20 is associated with a locking means (not shown) enabling the immobilization of the cowl 20 in the direct jet position thereof and selectively releasing the cowl 20.

Figure 4:
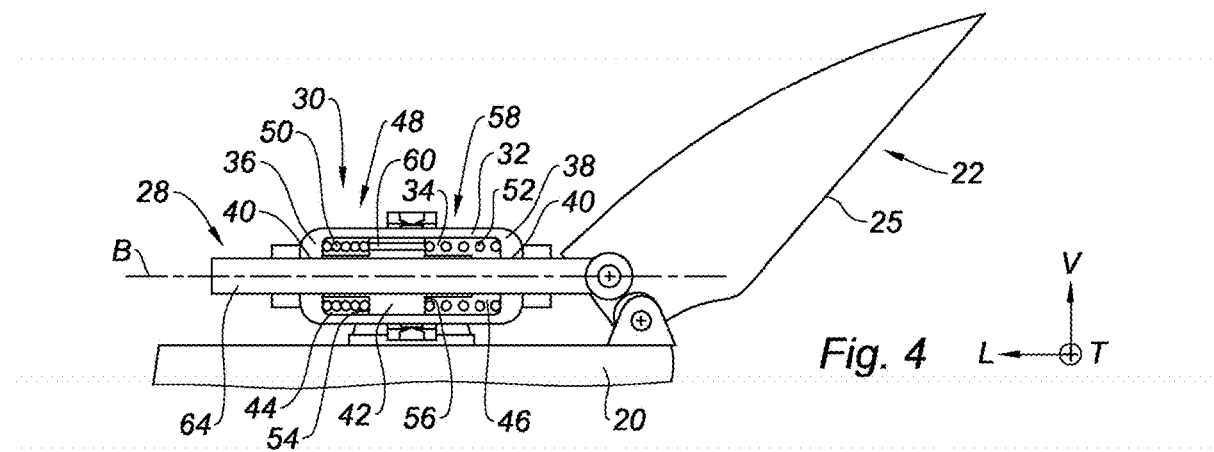
FIG. 4 is a schematic detail view in a longitudinal section, which illustrates the coupler of FIG. 2 in a position corresponding to a position of an increased ejection section of the nozzle.
Figure 5:
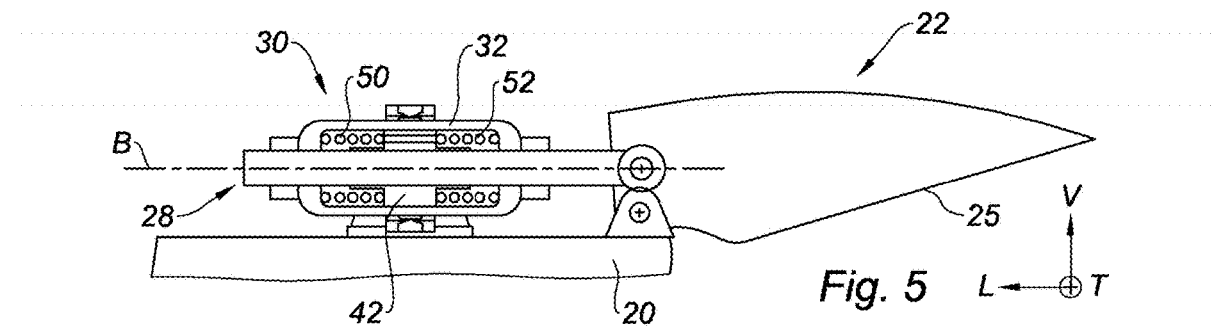
FIG. 5 is a schematic detail view in a longitudinal section, which illustrates the coupler of FIG. 2 in a position corresponding to a position of a neutral ejection section of the nozzle.

The variable section outlet nozzle 22 is movably mounted on the fixed structure of the thrust reverser 18 between at least one reduced section ejection position illustrated in FIG. 6, an increased section ejection position illustrated in FIG. 4 and an intermediate neutral position illustrated in FIG. 5.

Each of the positions of the nozzle 18 corresponds herein to a different inclination of the flaps 25 (only one of which is shown in the figures) which are pivotally mounted on the fixed structure of the thrust reverser 18 for varying the ejection section of the nozzle 18.

To this end, the actuator 24 includes a body 26 mounted on the fixed structure of the thrust reverser 18 and an actuating rod 28 which is adapted to selectively drive in displacement the variable nozzle 22 or the set constituted by the variable nozzle 22 and the movable cowl 20.

For this purpose, the thrust reverser 18 is equipped with an elastic coupler 30, shown in detail in FIGS. 4 to 6, which includes a fixed body 32 on the thrust reverser cowl 20.

The body 32 of the coupler 30 delimits a cavity 34 having a hollow cylindrical shape which extends axially along an axis B parallel to the axis of the actuating rod 28 of the cylinder 24.

The cavity 34 is radially delimited by a radial upstream wall 36 and by a radial downstream wall 38 opposite to each other, which are each pierced with a passage hole 40 along the axis B.

In addition, the coupler 30 includes a piston 42 which is fastened to the actuating rod 28 and which is slidingly mounted in the body 32 of the coupler 30, through the passage holes 40 provided to this end, dividing the cavity 34 into a first upstream compartment 44 and a second downstream compartment 46.

Also, the coupler 30 is equipped with elastic return and abutment device 48 which are constituted by a first helical spring 50 and a second helical spring 52.

The first spring 50 is axially interposed between the upstream wall 36 of the body 32 and a first annular seat 54 formed by the piston 42, and symmetrically, the second spring 52 is axially interposed between the downstream wall 38 of the body 32 and a second annular seat 56 formed by the piston 42.

The return means 48 act on the actuating rod 28 through the piston 42 and the body 32 of the coupler 30 for elastically returning the actuating rod 28 to a neutral position.

More particularly, the return means 48 are calibrated so that, when the cowl 20 is unlocked, the return means 48 oppose the relative displacement of the actuating rod 28 relative to the cowl 20, so as to enable the displacement of the set constituted by the cowl 20 and the nozzle 22.

Conversely, when the cowl 20 is locked, the cylinder 24 drives the actuating rod 28 against the return means 48, so as to enable the displacement of the nozzle 22.

FIG. 5 illustrates the behavior of the coupler 30 when the cowl 20 of the thrust reverser 18 is unlocked and movable in translation.

According to FIG. 5, the return means 48 jointly act so as to position the piston 42 in a generally central position which corresponds to the neutral position of the nozzle 22.

It will be noted that the neutral position of the nozzle 22 depends on the respective calibration of the first spring 50 and the second spring 52 forming the return means 48.

In addition, the return means 48 are sufficiently calibrated to transmit the movement of the actuating rod 28 to the set constituted by the movable cowl 20 and the nozzle 22.

FIGS. 4 and 6 illustrate the behavior of the coupler 30 when the cowl 20 of the thrust reverser 18 is locked to the fixed structure of the thrust reverser 18.

Referring to FIG. 4, the cylinder 24 draws the actuating rod 28 so as to cause the movement of the nozzle 22 to the increased ejection section position thereof.

Conversely, referring to FIG. 6, the cylinder 24 pushes the actuating rod 28 so as to cause the movement of the nozzle 22 to the reduced ejection section position thereof.

It will be noted that the stroke of the actuating rod 28 is limited by the piston 42 of the coupler 30 which is designed to come into axial abutment on the upstream wall 36 and the downstream wall 38 of the body 32 of the coupler 30, thereby enabling limiting the forces applied on the nozzle 22 by the cylinder 24.

Advantageously, the elastic return means 48 are calibrated so that the neutral position of the nozzle 22 is substantially invariable, whether the cowl 20 is locked on the fixed structure of the thrust reverser, or the cowl 20 is unlocked.

It will be noted that the neutral position of the nozzle 22 depends on the respective calibration of the first spring 50 and the second spring 52 both forming the return means 48 as well as the aerodynamic forces exerted on the nozzle 22.

Depending on the nozzle 22 type, it is possible to set the calibration of the return means 48 so that the stress exerted by the return means 48 on the actuating rod is much greater than the resultant of the aerodynamic forces exerted on the nozzle 22, so that the neutral position of the nozzle 22 is substantially invariable and corresponds to the balance between the first spring 50 and the second spring 52, regardless of the flight situations.

According to another aspect of the present disclosure, the coupler 30 includes damping device 58 which are designed to limit the jerks transmitted to the cowl 20 and to the nozzle 22 by the actuating rod 28, in particular during the unlocking of the cowl 20.

Indeed, the unlocking of the cowl 20 causes an abrupt change of the distribution of the forces between the cowl 20 and the nozzle 22.

The damping device 58 include a damping fluid which fills the cavity 34 of the body 32 of the coupler 30, the piston 42 of the coupler 30 having a channel 60 enabling the damping fluid to flow between the first compartment 44 and the second compartment 46 of the cavity 34 during the displacement of the piston 42, for braking and damping the displacement of the actuating rod 28.

The damping device 58 is designed to have a damping time constant close to the duration required to switch the nozzle 22 from the reduced ejection section position thereof to the increased ejection section position thereof, this time constant being greater than the duration of deployment of the movable cowl 20 of the thrust reverser 18.

Indeed, the average deployment time of the cowl 20 from the direct jet position thereof to the reverse jet position thereof, is approximately two seconds, while the average time required to switch the nozzle 22 from the reduced ejection section position thereof to the increased ejection section position thereof is much greater.

Thus, the nozzle 22 will substantially keep the same angular position between the beginning and the end of the stroke of the cowl 20 from the direct jet position thereof to the reverse jet position thereof.

An alternative solution to avoid the jerks transmitted to the nozzle 22 consists in adapting the damping so that the nozzle 22 is slightly closed at the beginning of the stroke of the cowl 20, in the range of twenty to thirty percent of its capacity.

According to another aspect, the actuating rod 28 includes a first segment 62 which is slidingly mounted in the body 26 of the cylinder 24 and a second segment 64 which is slidingly mounted in the body 32 of the coupler 30.

As can be seen in FIG. 7, the first segment 62 and the second segment 64 are connected to each other by a mechanical connection 66 allowing a noticeable offset of axes and an uncoupling of the first segment 64 and the second segment 66 of the actuating rod 28.

For this purpose, the mechanical connection 66 includes a head 68 with an elliptical section which is connected on a free end of the first segment 62 of the actuating rod 28, and a fastener 70 which is connected on a free end of the second segment 64 of the actuating rod 28.

The fastener 70 comprises a U-shaped housing in which the head 68 is arranged, so as to enable a relative radial displacement of the head 68 and of the fastener 70.

Thus, the mechanical connection 66 enables separating the fastener 70 from the head 68 thereby enabling a disconnection of the first segment 64 and the second segment 66 of the actuating rod 28 during the opening of the cowl 20 in the maintenance configuration.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser for a nacelle of an aircraft turbojet engine comprising:
   a thrust reverser cowl movable in translation along a direction substantially parallel to a longitudinal axis (A) of the nacelle, between a direct jet position and a reverse jet position;
   a variable section outlet nozzle arranged in the downstream extension of said thrust reverser cowl and which is movable between at least one reduced ejection section position, an increased ejection section position, and an intermediate neutral position; and
   at least one actuator which comprises a body mounted on a fixed structure of the thrust reverser and an actuating rod, said rod being adapted to drive in displacement the variable section outlet nozzle and the thrust reverser cowl,
   wherein said thrust reverser is equipped with an elastic coupler including:
   a body secured to the thrust reverser cowl; and
   an elastic return and abutment device which supported by the body of the coupler and which cooperate with the actuating rod of the actuator so as to elastically return the nozzle in the intermediate neutral position thereof, said elastic return means being calibrated so that, when the cowl is unlocked, the elastic return and abutment device oppose relative displacement of the actuating rod relative to the thrust reverser cowl to enable displacement of together, the thrust reverser cowl and the variable section outlet nozzle, and when the thrust reverser cowl is locked, the at least one actuator drives the actuating rod against the elastic return and abutment device so as to enable displacement of the variable section outlet nozzle.

2. The thrust reverser according to claim 1, wherein the elastic return and abutment device is calibrated so that the neutral position of the variable section outlet nozzle is invariable, whether the thrust reverser cowl is locked on the fixed structure of the thrust reverser or the thrust reverser cowl is unlocked.

3. The thrust reverser according to claim 1, wherein the coupler includes:
   a cavity formed by the body of the coupler and having a hollow shape extending generally axially along an axis (B) of the actuating rod and which is radially delimited by a radial upstream wall and by a radial downstream wall,
   a piston fastened on the actuating rod of the actuator and which is slidingly mounted in the body of the coupler dividing said cavity into a first compartment and a second compartment; and
   a first spring and a second spring forming said elastic return and abutment device, which are axially interposed between the upstream wall of the body and the piston, and between the downstream wall and the piston, respectively.

4. The thrust reverser according to claim 3, wherein the actuating rod includes a first segment which is slidingly mounted in the body of the actuator and a second segment which supports the piston of the coupler, said segments being connected to each other by a mechanical connection enabling an offset of axes of the first segment and of the second segment of the actuating rod.

5. The thrust reverser according to claim 4, wherein the mechanical connection allows an uncoupling of the first segment and the second segment of the actuating rod.

6. The thrust reverser according to claim 4, wherein the mechanical connection includes a head with an elliptical section which is connected on a free end of the first segment of the rod, and a U-shaped fastener which is connected on a free end of the second segment of the rod and which cooperates with said head so as to enable a relative displacement of the head and of the fastener and to allow an uncoupling of the first section and the second section of the actuating rod.

7. The thrust reverser according to claim 1 further comprising a damping device configured to limit jerks transmitted to the thrust reverser cowl and to the variable section outlet nozzle during the unlocking of the thruster reverser cowl.

8. The thrust reverser according to claim 7, wherein the damping device includes a damping fluid which fills the cavity of the body of the coupler, the piston of the coupler having a channel enabling the damping fluid to flow between the first compartment and the second compartment of the cavity during the displacement of the piston, so as to damp the displacement of the actuating rod.

9. The thrust reverser according to claim 7, wherein the damping device is has a time constant close to a duration required to switch the variable section outlet nozzle from the reduced ejection section position thereof to the increased ejection section position thereof, said time constant being greater than a duration of deployment of the thrust reverser cowl of the thrust reverser.

10. A nacelle of an aircraft turbojet engine equipped with a thrust reverser according to claim 1.

* * * * *